(12) United States Patent
Love et al.

(10) Patent No.: US 7,831,840 B1
(45) Date of Patent: Nov. 9, 2010

(54) SYSTEM AND METHOD FOR CODIFYING SECURITY CONCERNS INTO A USER INTERFACE

(75) Inventors: Robert Love, Cambridge, MA (US); Nat Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 1068 days.

(21) Appl. No.: 11/043,984

(22) Filed: Jan. 28, 2005

(51) Int. Cl.
*H04L 29/06* (2006.01)
(52) U.S. Cl. ............... 713/189; 713/165; 726/16
(58) Field of Classification Search ............ 726/2, 726/16–24; 713/165–167, 187–188; 707/687, 707/690, 781, 783
See application file for complete search history.

(56) References Cited

U.S. PATENT DOCUMENTS

| | | | |
|---|---|---|---|
| 5,987,123 A * | 11/1999 | Scott et al. | 713/165 |
| 6,779,117 B1 * | 8/2004 | Wells | 726/24 |
| 6,901,251 B1 * | 5/2005 | Kiessling et al. | 455/410 |
| 7,114,177 B2 * | 9/2006 | Rosenberg et al. | 726/4 |
| 7,305,709 B1 * | 12/2007 | Lymer et al. | 726/25 |
| 2002/0147988 A1 * | 10/2002 | Nakano | 725/134 |
| 2003/0028761 A1 * | 2/2003 | Platt | 713/150 |
| 2003/0055737 A1 * | 3/2003 | Pope et al. | 705/26 |
| 2004/0034794 A1 * | 2/2004 | Mayer et al. | 713/200 |
| 2004/0078422 A1 * | 4/2004 | Toomey | 709/202 |
| 2006/0026676 A1 * | 2/2006 | O'Donoghue | 726/22 |
| 2006/0095972 A1 * | 5/2006 | Rogalski | 726/26 |

FOREIGN PATENT DOCUMENTS

WO   WO 03/003170 A1 *   1/2003

OTHER PUBLICATIONS

Ivens, Kathy. "Controlling Users with the Policy Editor," WindowsITPro, Feb. 1998.*
Underdahl, Brain. "Opera(r) Web Browser for Dummies," IDG Books Worldwide, 2000.*
"Fortres 101 Version 5.0." 2003, Fortres Grand Corporation.*
McAfee Security, "McAfee Internet Security Suite—Version 6.0," Jun. 2003, Networks Associates Technology, Inc.*
U.S. Appl. No. 60/540,714, filed Jan. 29, 2004.*

* cited by examiner

*Primary Examiner*—Kimyen Vu
*Assistant Examiner*—Darren Schwartz
(74) *Attorney, Agent, or Firm*—Pillsbury Winthrop Shaw Pittman LLP

(57) ABSTRACT

A system and method are provided for codifying security concerns into a user interface. An application launching a window may be determined, and the security attributes associated with the application may be ascertained. If the security attributes indicate that the application is insecure, the window may be visually and/or behaviorally modified to reflect the level of security of the application.

14 Claims, 5 Drawing Sheets

US 7,831,840 B1

SYSTEM AND METHOD FOR CODIFYING SECURITY CONCERNS INTO A USER INTERFACE

FIELD OF THE INVENTION

The invention relates to a system and method of creating a trusted user interface by codifying security concerns into the user interface.

BACKGROUND OF THE INVENTION

As the pervasiveness of computers grows, so do concerns over their security. Many security issues stem from malevolent software, user mistakes, and/or a failure to upgrade programs with known security holes. Typically, users are unaware of these security issues because the user interfaces only with a front end application, such as a user interface. Problems associated with these and other security issues could largely be prevented if the user interface effectively communicated the notions of security with the user of the computer.

These and other problems exist in known computer systems.

SUMMARY OF THE INVENTION

According to various embodiments of the invention, a mechanism is provided for presenting a trusted user interface. The system and method of the present invention codifies security concerns into a user interface provided by a computer device. The invention allows the user interface to readily communicate security concerns to the user with visual and/or other indicators. The appearance and/or behavior of one or more windows presented by the user interface may be modified to reflect the trustworthiness of the application launching a window and/or the content provided by window.

A system implementing various aspects of the invention may include some or all of the following components. An operating system running one or more applications may include a user interface manager for managing the display of one or more windows. The user interface manager may include a security layer for determining security attributes of one or more applications presenting a window and for codifying the security attributes into the window.

The security layer may include one or more security layer modules. A mapping module may be provided for determining the application source of one or more windows which are to be displayed. The mapping module may also determine security attributes associated with the application source. According to some embodiments of the invention, the mapping module may determine the source and security attributes of content to be presented by a window.

A user interface module may be provided for integrating security concerns into the user interface rendering. The user interface module may obtain security attribute information from the mapping module. Using the security attribute information, the user interface module may modify the behavior and/or appearance of one or more elements of a window before presenting the window. Elements may include, for example, a title bar, embedded graphics, icons, and/or other elements.

The system of the present invention may present a window displaying elements that are modified to reflect their level of trustworthiness. For example, the color and/or behavior of a window element may be modified. Security attributes affecting the display of window elements may include whether the application launching the user window has been officially signed by a trusted source, whether the application launching the window is displaying trusted data, whether appropriate user credentials have been provided, and/or other security attributes. According to some embodiments of the invention, an administrator may create a list of approved applications. A window originating from outside the applications on the list may be deemed non-trustworthy.

Applications which are trusted may sometimes present data that should not be trusted. According to some embodiments of the invention, the source of the data is determined by examining a path of execution of a window. If the source is not trusted, the window display may be modified to indicate that the data should not be trusted. An application may be non-trustworthy because the application needs to be upgraded. According to some embodiments of the invention, indicia may be provided in a window indicating a need to perform an upgrade.

A method for presenting a trusted graphical user interface may operate by first determining the source application for a particular window to be displayed. The object code for the program that launched a window may be determined. The source may be evaluated to determine its security attributes. If it is determined that the source and/or its content may not be trusted, a user interface module may modify the intended window to indicate the level of trustworthiness of the window.

These and other objects, features, and advantages of the invention will be apparent through the following detailed description and the drawings attached hereto. It is also to be understood that both the foregoing general description and the following detailed description are exemplary and not restrictive of the scope of the invention.

DETAILED DESCRIPTION OF PREFERRED EMBODIMENTS

Figure 1:
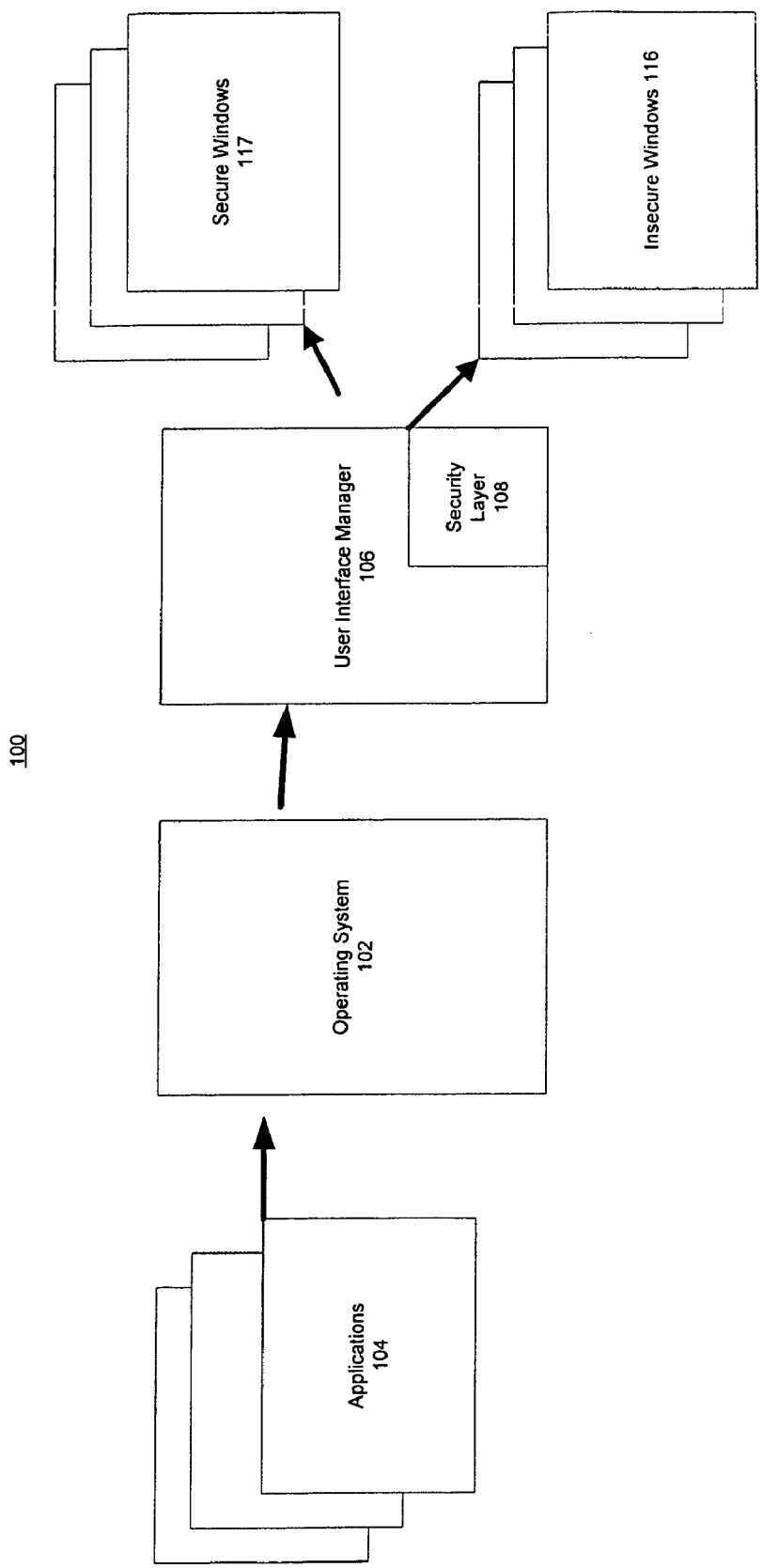
FIG. 1 illustrates a system diagram, according to various embodiments of the invention.

According to various embodiments of the invention, a system is provided for presenting a trusted user interface. FIG. 1 illustrates a system 100 implementing various embodiments of the invention. System 100 may comprise an operating system 102 and a user interface manager 106. As indicated in FIG. 1, an operating system 102 may have running thereon one or more applications 104. Operating system 102 may be any type of operating system such as, for example, Microsoft Windows, Linux, Unix, and/or other operating systems. Applications 104 may include, for example, office productivity applications such as the Microsoft Office applications, web browsers such as Netscape and/or Internet Explorer, system applications, and/or other applications.

Each application may present data to a user via a user interface presenting one or more windows. As such, user interface manager 106 may be provided for managing the user interface and presented windows.

According to various embodiments of the invention, user interface manager 106 may include a security layer 108. Security layer 108 may be responsible for arbitrating all user interface renderings. Security layer 108 may interface with one or more security modules, which will be described in greater detail below, to ascertain security attributes of the user interface. Security layer 108 may obtain object code from the application for each window presented by the user interface to obtain security attributes. User interface manager 106 may then present windows, such as windows 114 and 116, which incorporate, visually, behaviorally, or otherwise, the security attributes for the presented windows.

Figure 2:
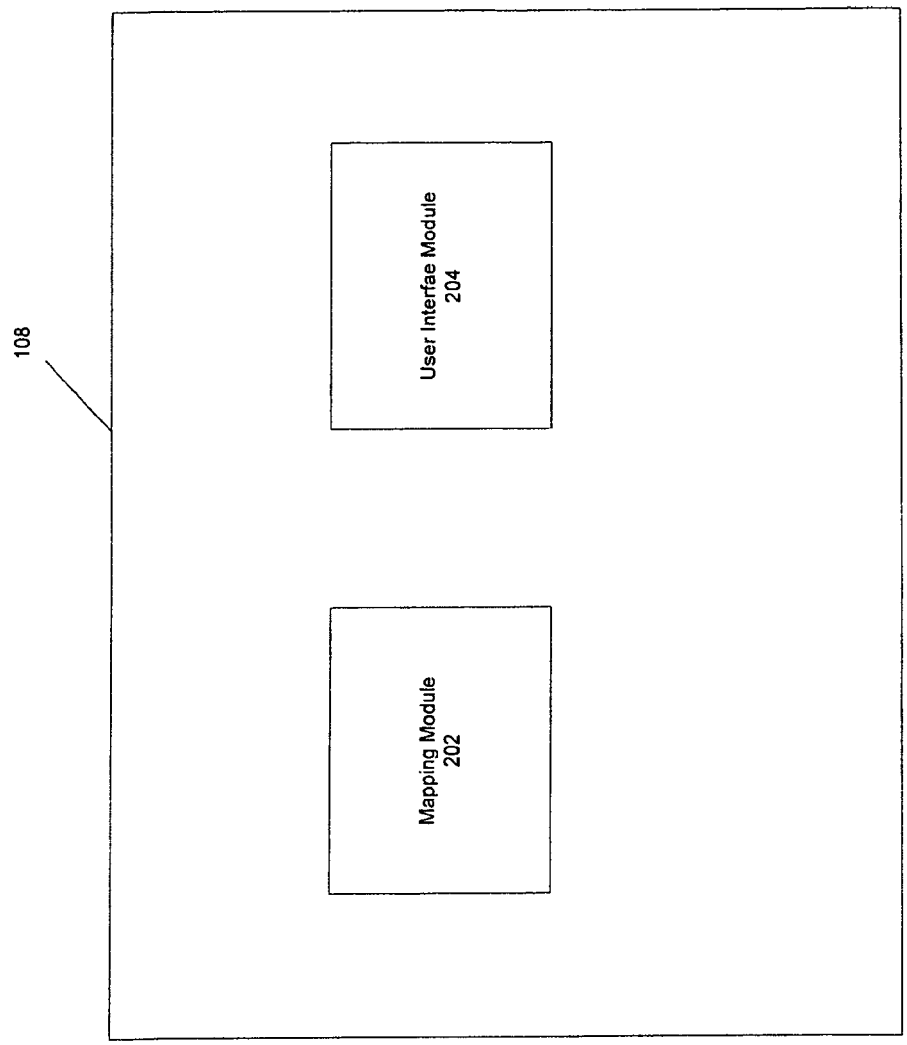
FIG. 2 illustrates a block diagram of a security module, according to various embodiments of the invention.

Security layer 108 may include one or more modules for implementing various embodiments of the invention, as illustrated in FIG. 2. A mapping module 202 may be provided for communicating with system specific modules to ascertain the security attributes of one or more windows to be presented. According to some embodiments of the invention, mapping module 202 may obtain binary code of an application launching a window to determine what security modules are being used by traversing from the window to be presented to the application that owns the window. For example, mapping module 202 may determine whether the binary code operating a particular window has been cryptographically signed by a trusted agent, whether the signature is still valid, whether the binary code has been edited, as well as other signature security features. According to some embodiments of the invention, mapping module 202 may check for other security attributes, such as user permissions, the presence of trusted data, the path of a window, and/or other security attributes. Other methods of ascertaining security attributes may be incorporated, as would be apparent.

Security layer 108 may also include user interface module 204 configured to modify the rendering of one or more windows presented by the user interface. Based on the ascertained security attributes of an application presenting a window, user interface module 204 may visually change the appearance of a window. For example, a window that is trusted may display designated "normal" attributes, while a window that is not trusted may present one or more of its elements with different attributes, such as a different color or other characteristics distinguishable from the "normal" attributes. According to some embodiments of the invention, a window that is not trusted may also be modified behaviorally, such as, for example, by presenting an element that "blinks". It will be appreciated that other methods of distinguishing trusted and non-trusted windows may be employed.

Figure 3:
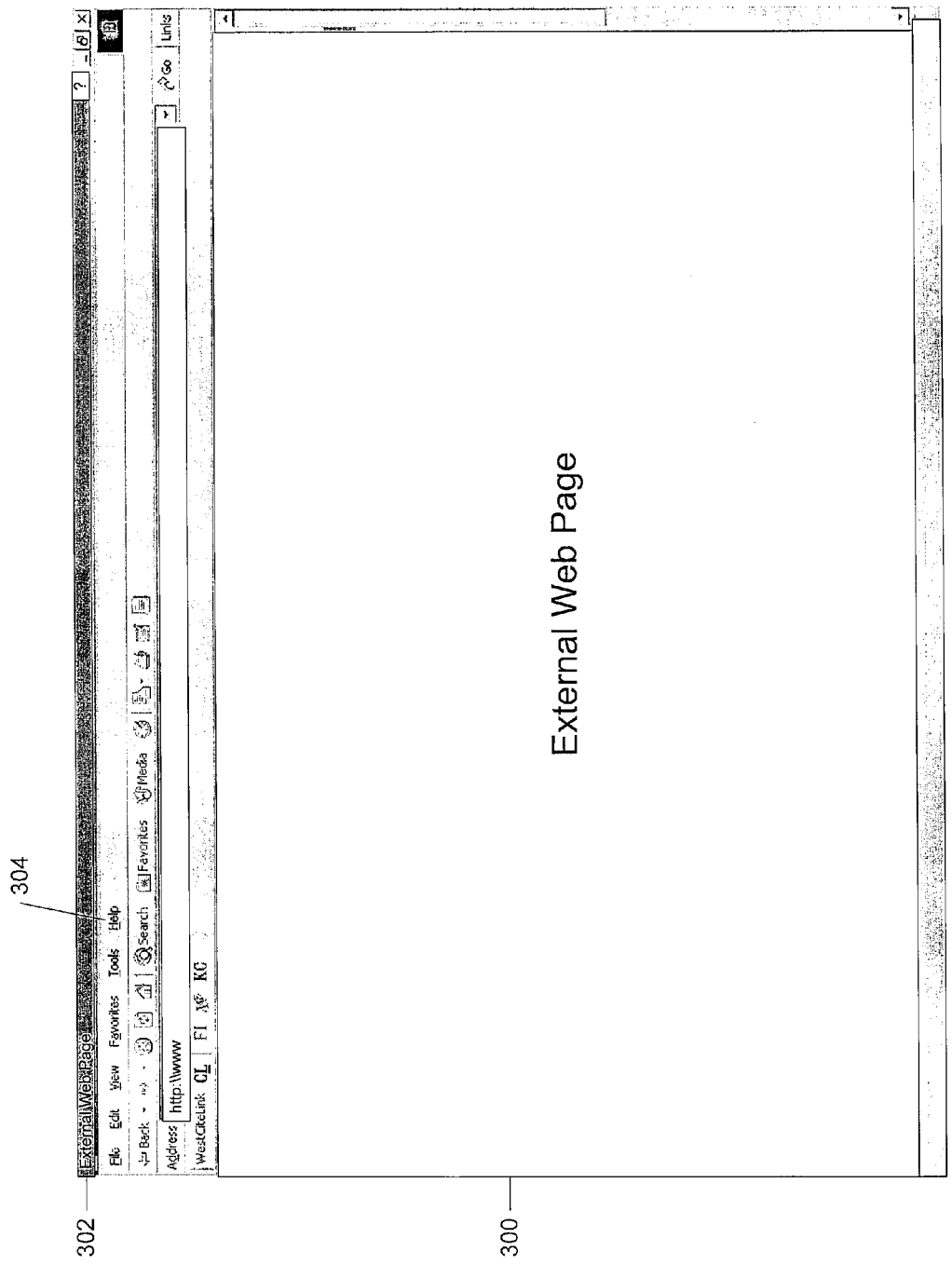
FIG. 3 illustrates a security aware user interface, according to various embodiments of the invention.

FIG. 3 illustrates an example of a non-trusted window 300. A title bar 302 of window 300 may be presented visually different from a title bar with designated "normal" attributes, depending on the security attributes of window 300. For example, as illustrated in FIG. 3, title bar 302 may be displayed in red indicating that window 300 may not be trustworthy. Title bar 302 may include icons usually associated with windows, such as, for example, icons to minimize, resize, and/or close a window. According to various embodiments of the invention, a help icon 304 may be provided. Help icon 304 may present user information such as a key, index, or legend, to assist in the clarification of the visual and/or behavioral changes that may be displayed by a window. In some embodiments of the invention, help icon 304 may present help information specific to the particular window. For example, icon 304, when selected, may present information indicating that window 300 is insecure because the application launching the window was downloaded by the user. It will be appreciated that other help information may be provided.

As a practical matter, it is quite possible that an application presenting a window may be trustworthy, but the content being presented may not be trustworthy. For example, a web browser may be deemed trusted, but the content may be from a non-trustworthy source. This may occur, for example, when pop-up windows are displayed when using a web browser. An organization may consider only content from within the organization to be trusted. Thus, if a user navigates to an external website, the window presenting the external content may be deemed non-trustworthy. By examining the path of execution of the window, every application and/or object responsible for presenting elements of the window may be evaluated for trustworthiness.

Figure 4:
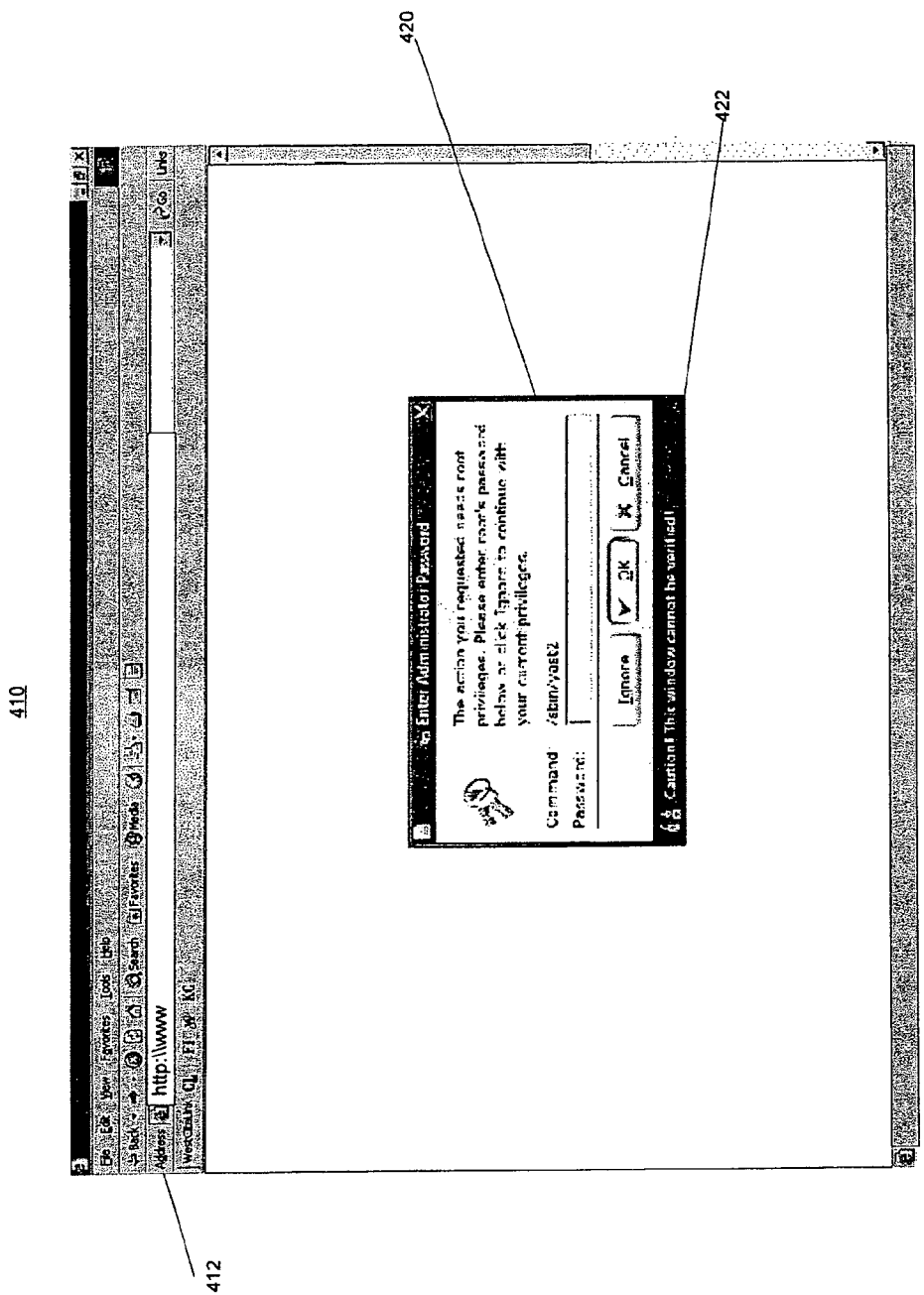
FIG. 4 illustrates a security aware user interface message, according to various embodiments of the invention.

To combat this and other related issues, embodiments of the present invention provide for the modification of the window and/or the conveyance of associated messages. In particular, FIG. 4 illustrates an example of a trusted application presenting potentially non-trusted data. A window 410 may be presented. For example, window 410 may be an internal webpage. As illustrated, window 410 may be trusted and presented visually and behaviorally in the usual manner. A user may enter an external website address into address field 412, and in response to selecting an option to navigate to the external website, pop-up window 420 may be presented. Window 420 may be non-trustworthy for any reason, such as, for example, because of its content or because an organization's administrator considers all external webpages to be non-trustworthy. According to some embodiments of the invention, a message, such as the message 422 may be presented, alerting the user that the content of window 420 may not be trustworthy. While described and presented in FIG. 4 as a web browser, other applications may alter the level of security based on non-trustworthy data. For example, a word processing application presenting a document including macros may be considered non-trustworthy and may be presented in a modified window.

A common cause for security issues related to computer applications is the failure to upgrade the application when needed. According to some embodiments of the invention, indicia may be provided in a window indicating that the application launching the window needs to be upgraded. For example, an icon may be presented in the title bar of a window indicating that the application has a pending upgrade. According to some embodiments of the invention, the indicia may vary depending on the severity of the upgrade. For example, critical updates, such as upgrades to correct security flaws, may provide obvious and ominous indicia to clearly alert the user to the possible security risk in continuing to use the application. Less serious upgrades may present less ominous indicia. According to some embodiments of the invention, critical updates may be automatically updated when the user closes the application.

Figure 5:
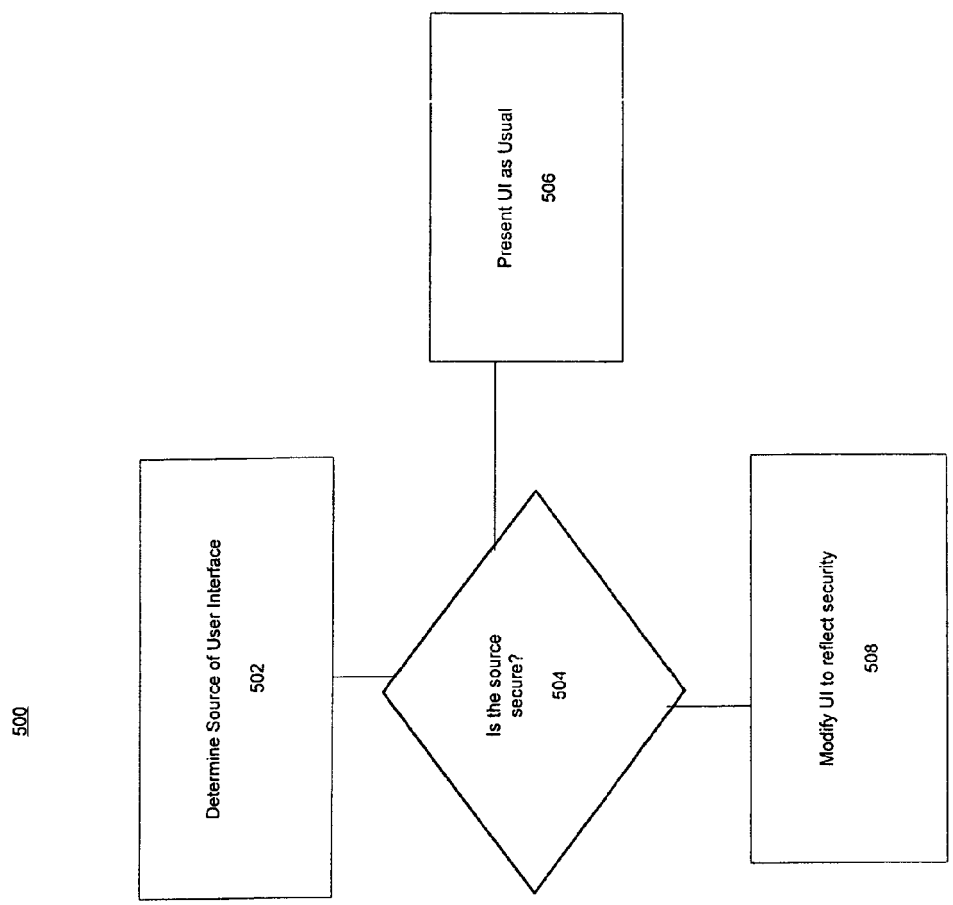
FIG. 5 illustrates a flowchart for presenting a security aware user interface, according to various embodiments of the invention.

FIG. 5 illustrates process 500 configured to determine security attributes of an application and present a trusted user interface, in accordance with various embodiments of the invention. At an operation 502, the source of a window may be determined. A user interface manager, such as user interface manager 106 (as illustrated in FIG. 1), may include a security layer. The security layer may traverse backward from the window to one or more applications or objects that launched the window. The security layer may, according to some embodiments of the invention, obtain the binary object code from the launching application.

Upon discovery of applications and/or objects responsible for launching the window, the security layer may determine one or more security modules used by the launching application or object to ascertain the level of security, as illustrated at operation 504. Determining one or more security modules may include determining whether a valid binary signature is present, ensuring that appropriate user credentials have been entered, determining the source of content to be presented, and/or other security features. According to some embodiments of the invention, an administrator may create a list of allowed and/or approved applications so that a window originating from a source other than the listed applications may be deemed non-trustworthy. Determining one or more security modules may include determining whether an application launching a window is on the approved applications list.

Ascertaining the level of security may also include determining whether a window is originating from processes that are acting suspicious. For example, a window may originate from an application that is "sniffing" network data. In accordance with embodiments of the present invention, a window originating from a suspicious location may be flagged as potentially non-trustworthy.

If, as illustrated at operation 506, a window is secure, the window may be presented in the "usual" or "normal" manner. However, if the security attributes determined at operation 504 indicate that the window is potentially non-trustworthy, one or more elements of the window may be modified to reflect the level of security, as illustrated at an operation 508. For example, if a window originated from a non-trusted source, one or more graphical elements of the window may be presented in a different color, such as bright red, to indicate that the window is not trusted. According to some embodiments of the invention, if the window is not trustworthy because a critical software update for the originating application is available, indicia may be provided in the window informing the user of the pending update. Other graphical and/or behavioral modifications may be made to the window, as would be apparent.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for codifying security concerns into user interface, wherein the system comprises at least one processor configured to:
   manage a display of a computer-generated window launched by an application, wherein the computer-generated window includes one or more display elements;
   traverse an execution path from the window to the application that launched the window, wherein the processor traverses the execution path from the window to the application that launched the window to obtain binary object code from the application that launched the window;
   obtain on one or more security attributes for the traversed execution path, wherein the processor obtains the one or more security attributes for the traversed execution path from the binary object code obtained from the application that launched the window;
   modify one or more of a behavior or an appearance of at least one of the one or more display elements in the window in response to determining that the one or more security attributes obtained for the traversed execution path indicate that the application is not trustworthy, wherein the modified behavior or appearance of the at least one display element visually indicates that the application is not trustworthy;
   determine whether content displayed in the window is trustworthy in response to determining that the one or more security attributes obtained for the traversed execution path indicate that the application is trustworthy; and
   modify one or more of the behavior or the appearance of the at least one of the one or more display elements in the window in response to determining that the content displayed in the window is not trustworthy, wherein the modified behavior or appearance of the at least one display element visually indicates that the content displayed in the window is not trustworthy.

2. The system of claim 1, wherein the processor determines that the one or more security attributes obtained for the traversed execution path indicate that the application is not trustworthy in response to the obtained binary object code having an invalid binary signature, displaying untrusted data in the window, not having appropriate user permissions, having a pending upgrade, or sniffing data on a network.

3. The system of claim 1, wherein the modified appearance includes a modified color of the at least one display element.

4. The system of claim 1, wherein the modified behavior causes the at least one display element to blink.

5. The system of claim 1, wherein the processor determines that the one or more security attributes obtained for the traversed execution path indicate that the application is not trustworthy in response to the obtained binary object indicating that the application originates from a source that does not appear in an approved applications list.

6. A method for codifying security concerns into user interface comprising:
   managing, by a processor, a display of a computer-generated window that includes one or more display elements, wherein managing the display of a computer-generated window includes determining an application that launched the window;
   traversing an execution path from the window to the application that launched the window, wherein the processor traverses the execution path from the window to the application that launched the window to obtain binary object code from the application that launched the window;
   obtaining one or more security attributes for the traversed execution path, wherein the processor obtains the one or more security attributes for the traversed execution path from the binary object code obtained from the application that launched the window;
   modifying one or more of a behavior or an appearance of at least one of the one or more display elements in the window in response to determining that the one or more security attributes obtained for the traversed execution path indicate that the application is not trustworthy, wherein the modified behavior or appearance of the at least one display element visually indicates that the application is not trustworthy;
   determining whether content displayed in the window is trustworthy in response to determining that the one or more security attributes obtained for the traversed execution path indicate that the application is trustworthy; and
   modifying one or more of the behavior or the appearance of the at least one of the one or more display elements in the window in response to determining that the content displayed in the window is not trustworthy, wherein the modified behavior or appearance of the at least one display element visually indicates that the content displayed in the window is not trustworthy.

7. The method of claim 6, wherein the processor determines that the one or more security attributes obtained for the traversed execution path indicate that the application is trustworthy in response to the binary object code having a cryptographic signature originating from a trusted agent.

8. The method of claim 6, wherein the processor determines that the one or more security attributes obtained for the traversed execution path indicate that the application is not trustworthy in response to the binary object code having an invalid binary signature.

9. The method of claim 6, wherein the modified appearance includes a modified color of the at least one display element.

10. The method of claim 6, wherein the modified behavior causes the at least one display element to blink.

11. The method of claim 6, wherein
the processor determines that the one or more security attributes obtained for the traversed execution path indicate that the application is not trustworthy in response to the obtained binary object code having a pending upgrade, and wherein the modified appearance visually indicates that the obtained binary object needs the pending upgrade.

12. The method of claim 11, wherein the modified appearance further visually indicates a severity of the pending upgrade.

13. A non-transitory computer readable storage medium including computer readable instructions stored thereon for codifying security concerns into a user interface, wherein executing the computer readable instructions on a processor causes the processor to:
manage a display of a computer-generated window that includes one or more display elements, wherein the processor determines an application that launched the window to manage the display of the window;
traverse an execution path from the window to the application that launched the window, wherein the processor traverses the execution path from the window to the application that launched the window to obtain binary object code from the application that launched the window;
obtain one or more security attributes for the traversed execution path, wherein the processor obtains the one or more security attributes for the traversed execution path from the binary object code obtained from the application that launched the window;
modify one or more of a behavior or an appearance of at least one of the one or more display elements in the window in response to determining that the one or more security attributes obtained for the traversed execution path indicate that the application is not trustworthy, wherein the modified behavior or appearance of the at least one display element visually indicates that the application is not trustworthy;
determine whether content displayed in the window is trustworthy in response to determining that the one or more security attributes obtained for the traversed execution path indicate that the application is trustworthy; and
modify one or more of the behavior or the appearance of the at least one of the one or more display elements in the window in response to determining that the content displayed in the window is not trustworthy, wherein the modified behavior or appearance of the at least one display element visually indicates that the content displayed in the window is not trustworthy.

14. A system for codifying security concerns into a user interface, wherein the system comprises at least one processor configured to:
manage a display of a computer-generated window launched by an application, wherein the computer-generated window includes one or more display elements;
traverse an execution path from the window to the application that launched the window, wherein the processor traverses the execution path from the window to the application that launched the window to obtain binary object code from the application that launched the window;
obtain one or more security attributes for the traversed execution path, wherein the processor obtains the one or more security attributes for the traversed execution path from the binary object code obtained from the application that launched the window;
modify one or more of a behavior or an appearance of at least one of the one or more display elements in the window in response to determining that the one or more security attributes obtained for the traversed execution path indicate that the application is not trustworthy, wherein the modified behavior or appearance of the at least one display element visually indicates that the application is not trustworthy;
determine whether content displayed in the window is trustworthy in response to determining that the one or more security attributes obtained for the traversed execution path indicate that the application is trustworthy, wherein the processor determines that the content displayed in the window is not trustworthy in response to determining that the traversed execution path indicates that a source of the content is not trustworthy; and
modify one or more of the behavior or the appearance of the at least one of the one or more display elements in the window in response to determining that the content displayed in the window is not trustworthy, wherein the modified behavior or appearance of the at least one display element visually indicates that the content displayed in the window is not trustworthy.

* * * * *